Nov. 7, 1961
T. F. PETERSON
3,007,243
METHOD FOR SECURING PROTUBERANCE ON
CABLE WITH HELICAL ARMOR RODS
Filed April 27, 1949
5 Sheets-Sheet 1
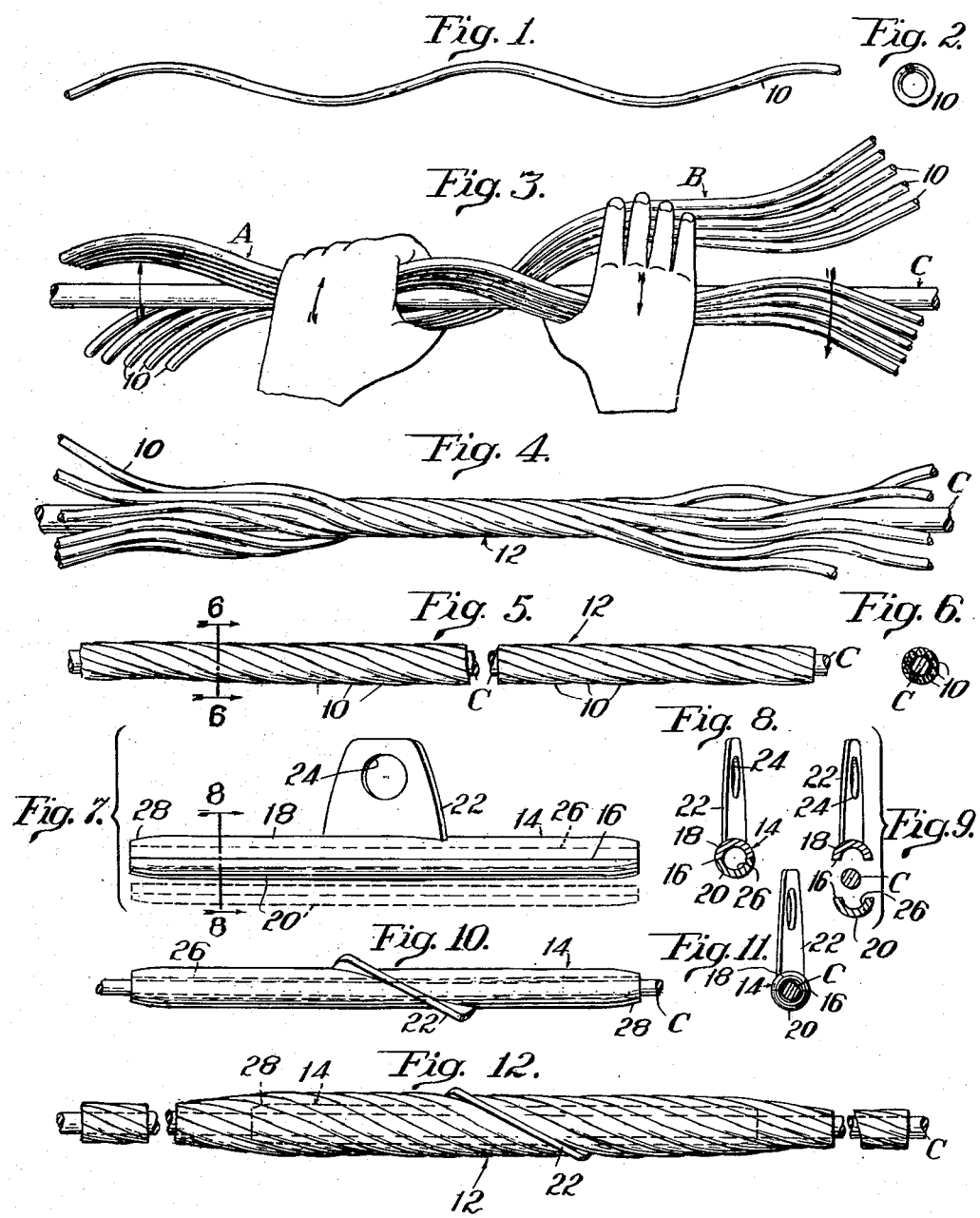
INVENTOR.
Thomas F. Peterson
BY
ATTORNEY

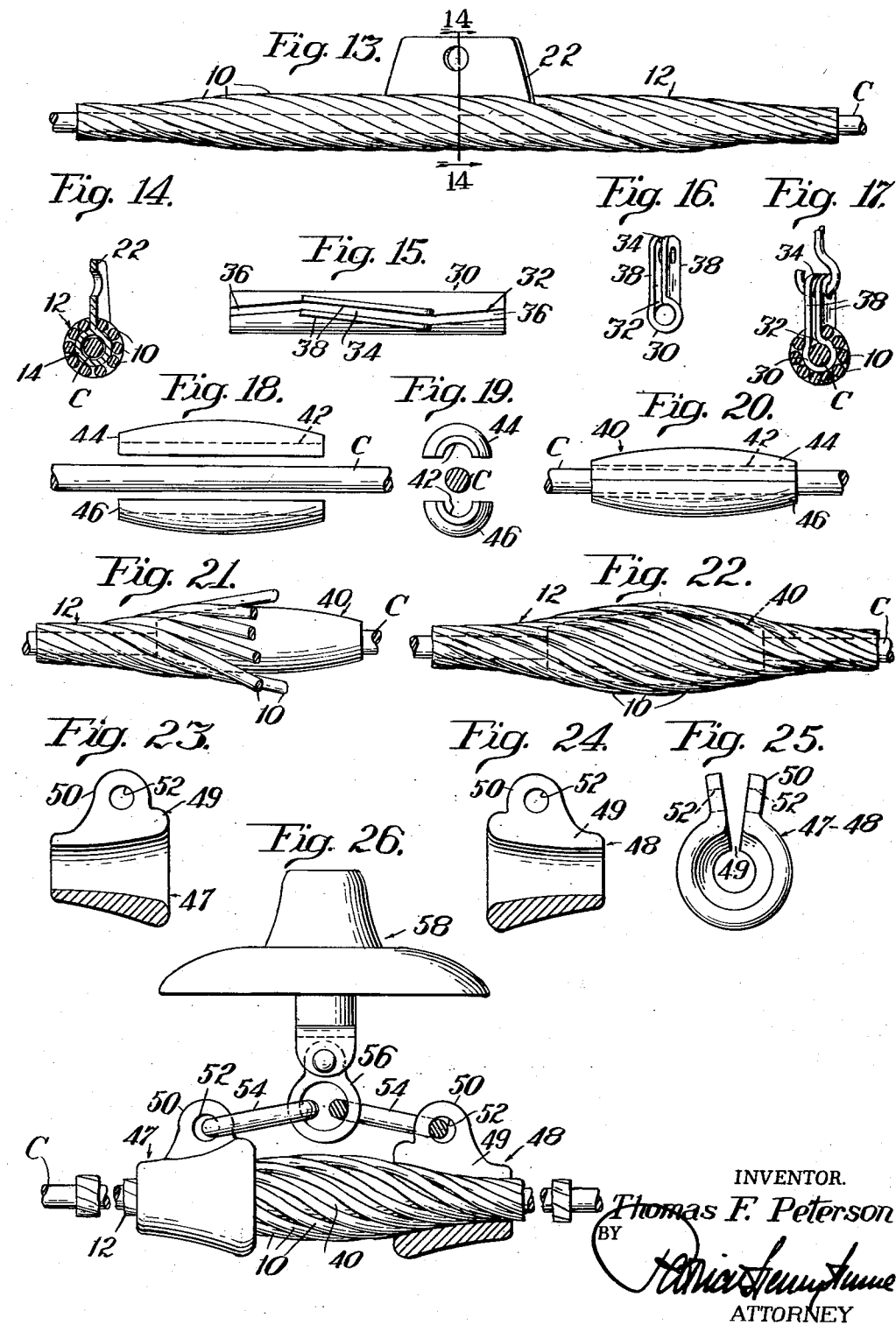

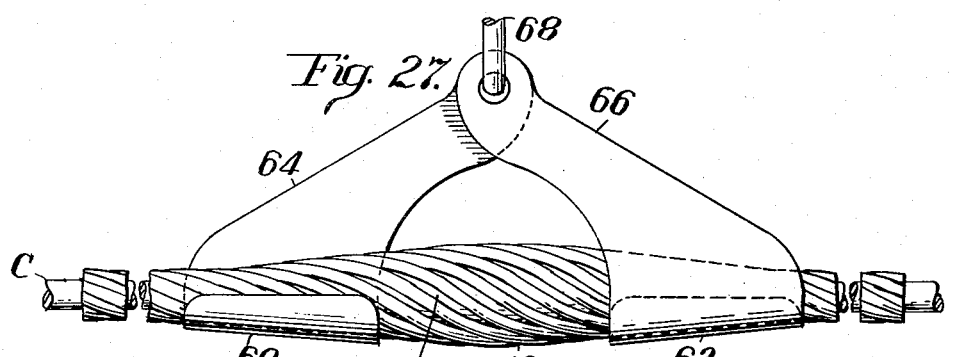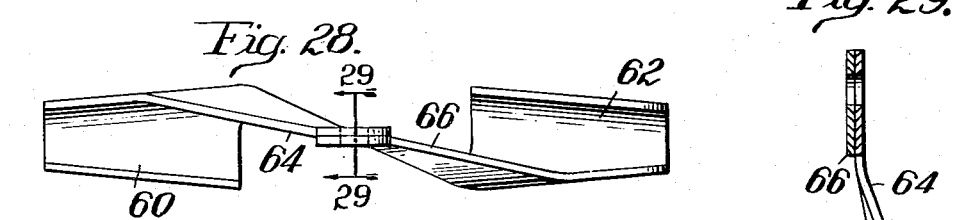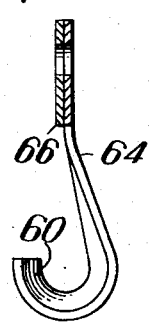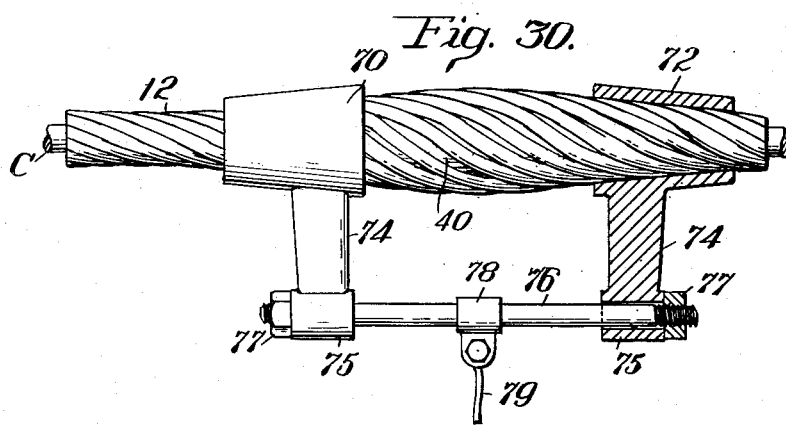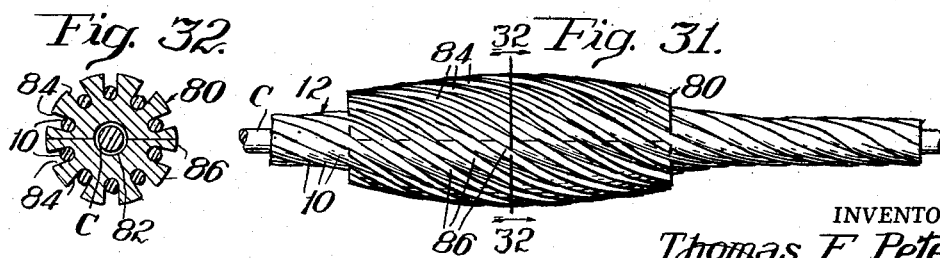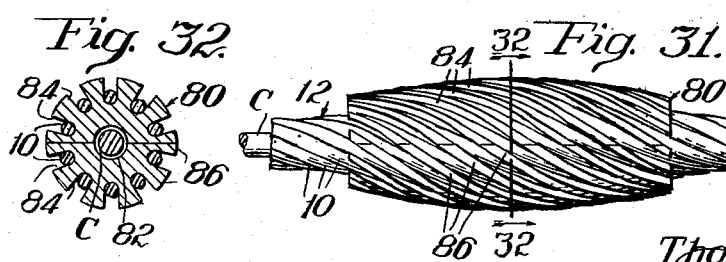
INVENTOR.
Thomas F. Peterson
BY
ATTORNEY

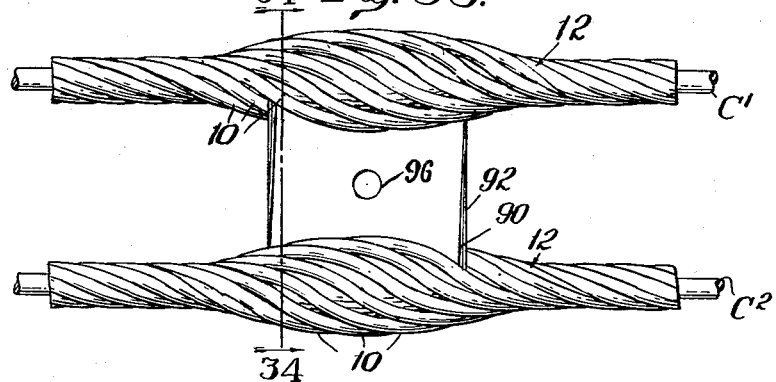
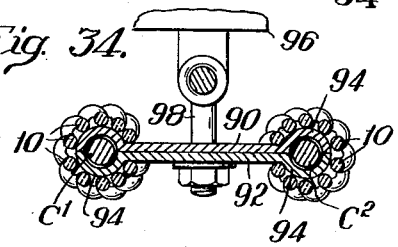
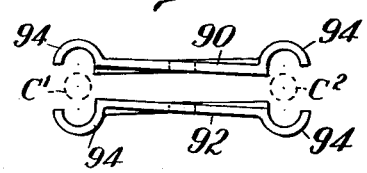
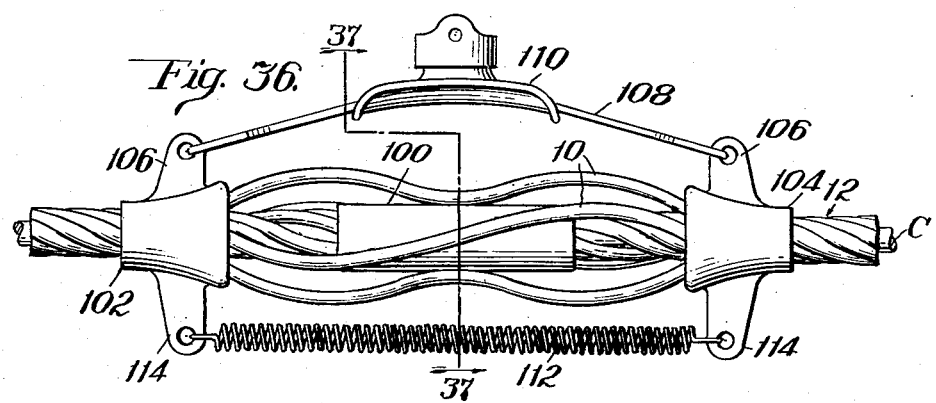
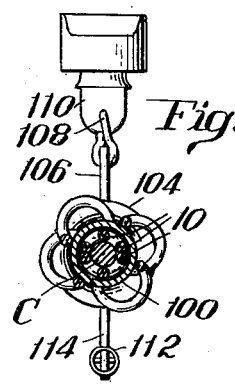

Nov. 7, 1961 T. F. PETERSON 3,007,243
METHOD FOR SECURING PROTUBERANCE ON
CABLE WITH HELICAL ARMOR RODS
Filed April 27, 1949 5 Sheets-Sheet 5
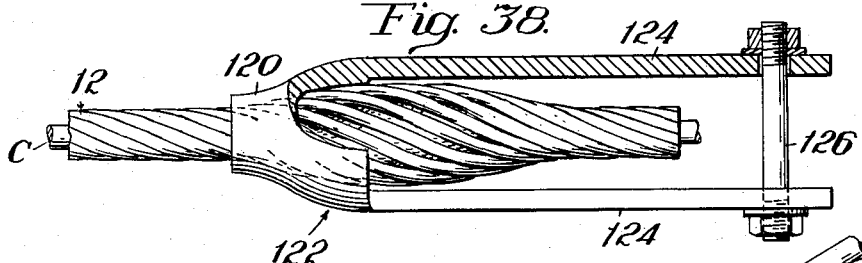
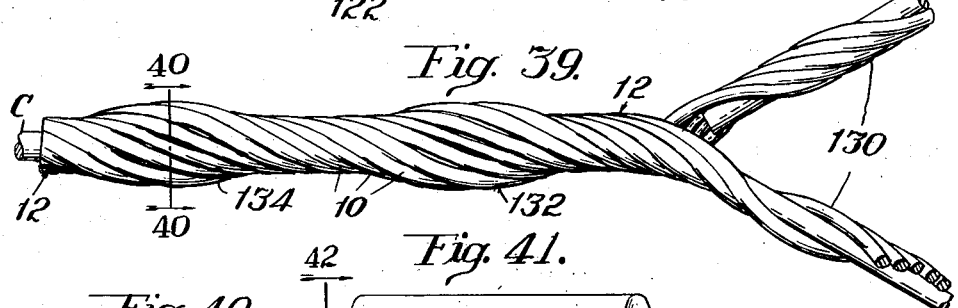
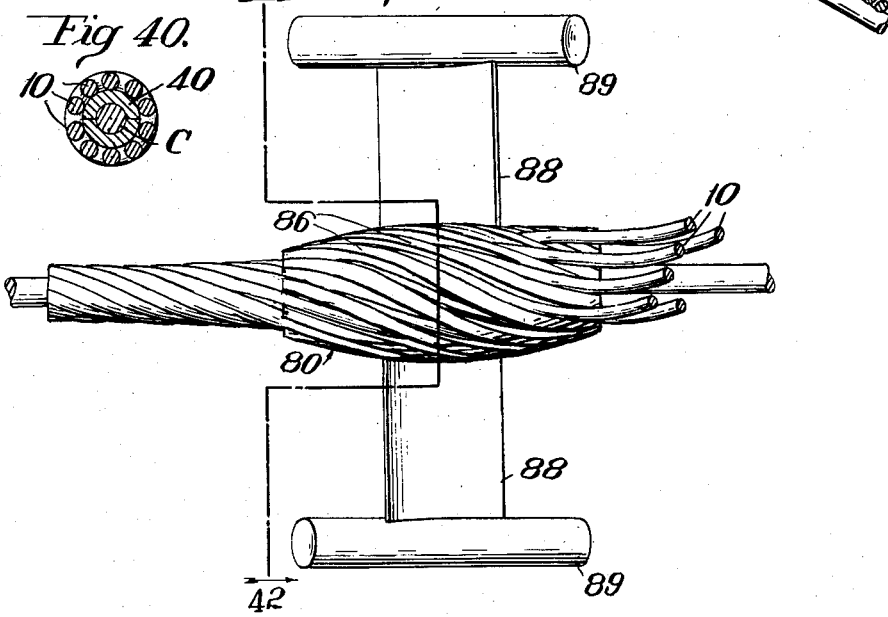
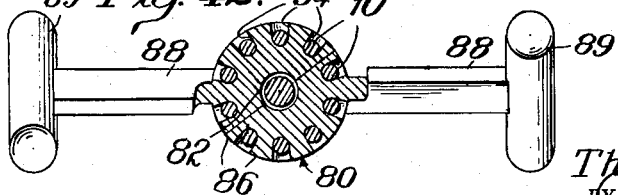
INVENTOR.
Thomas F. Peterson
BY
ATTORNEY

United States Patent Office 3,007,243
Patented Nov. 7, 1961

3,007,243
METHOD FOR SECURING PROTUBERANCE ON CABLE WITH HELICAL ARMOR RODS
Thomas F. Peterson, Shaker Heights, Ohio, assignor to Preformed Line Products Company, Cleveland, Ohio, a corporation of Ohio
Filed Apr. 27, 1949, Ser. No. 89,986
1 Claim. (Cl. 29—419)

The inventions herein disclosed and claimed relate to the reinforcement, hanging, tapping, clamping, gripping and dead-ending of overhead electrical transmission lines. More specifically, the inventions are concerned with the adaption and utilization for such purposes of helically preformed armor rods like those shown in and covered by my patent, No. 2,275,019, and my copending applications, Serial No. 601,245, filed June 23, 1945, now Patent No. 2,587,521; Serial No. 698,312, filed September 20, 1946; and Serial No. 2,200, filed January 14, 1948.

As mentioned in my previous applications and patent, armor rods comprising helically preformed metal or plastic bodies shaped to an internal helical diameter and angle of lay, or pitch angle, to be applied to overhead transmission lines and similar bodies from the side of the latter, are so applied usually by dividing a set of armor rods into two groups and by arranging the groups upon each side of the transmission line and twisting the opposite ends in opposite directions suitable to the hand of the helix, until the rods come into place about the conductor. This may be done manually or with the use of tools, and the conductor may be completely enclosed by an appropriate number of armor rods, or partially enclosed by the attachment of but one or more for this purpose. These rods, being formed from fairly rigid stock to a helical diameter the same as or slightly less than the outside diameter of the suspended line of association, tightly grip the latter when in place, and resist displacement in any direction of the line save by untwisting.

Previously, it has been customary to apply such armor at points of suspension of overhead transmission lines for the purpose of reinforcing the lines adjacent the connections to minimize bending stresses, while at the same time insuring that the lines are securely anchored against longitudinal slippage. This protects the lines against damage by chafing at the supports, and against fatigue stresses, which localize at such points. The fastenings to the supports have usually been effected by the conventional type of clamps or ties known to the industry.

It is the first object of the invention to utilize armor rods in addition to their normal functions for the attachment of hanger fixtures or taps to electrical conductors in such a way that extraneous fittings, clamps, ties, etc., are completely eliminated, and so that a more efficient, economical type of hanger or tap is provided.

It is a corollary object to provide fastenings of this kind for electrical conductors which have the simplest possible mechanical characteristics, and which afford greatly improved electrical properties in the avoidance of corona losses throughout the installation, and in effecting stable, low-resistance electrical joints.

It is another object to provide electrical conductor fittings of the kind described which may be attached in the field with substantially the same ease of application that preformed armor rods are themselves applied, and further, which will afford a degree of permanence against displacement such as characterizes the more elaborate, expensive, and inefficient fittings currently provided for this purpose.

It is a related object to provide means for tying parallel conductors together and for hanging conductors in parallel. It is a further object to provide for the tapping of conductors and for the provisions of dead-ends on conductors, which apply to the techniques disclosed in my previous applications above described. Vibrational dampers are within the purview of these inventions, the details of which will be more clearly brought out hereinafter.

In the accompanying drawings,

FIGURES 1 and 2 are side elevational and end views, respectively, of a single length of a helically preformed armor rod made to perform the needs of the inventions herein contained, and as appears in my preceding patent and applications above identified.

FIGURE 3 is a side elevational view of the method of armoring an electrical conductor by the manual application of helically preformed armor rods, which are divided into two groups arranged upon opposite sides of the conductor and simultaneously twisted in opposite directions.

FIGURE 4 represents a side elevational view of the wrapping process, the initiation of which is illustrated in FIGURE 3, showing the rods nearly completely in position to enclose the conductor. FIGURES 5 and 6 are side and end views, respectively, of the installation of armor rods in place upon a conductor.

FIGURE 7 is a side elevational view of one form of hanger or tap fitting for use in connection with the present invention.

FIGURE 8 is a sectional view taken along lines 8—8 of FIGURE 7, while FIGURE 9 is a view corresponding to FIGURE 8 showing the fitting in open position to embrace a conductor.

FIGURE 10 is a plan view of FIGURE 7, while FIGURE 11 is an end view of FIGURE 10.

FIGURE 12 is a plan view of the arrangement of FIGURE 10 enclosed in a set of helically preformed armor rods, applied as shown in FIGURE 3.

FIGURE 13 is a side elevational view of the device shown in FIGURE 12, while FIGURE 14 is a sectional view taken along line 14—14 of FIGURE 13.

FIGURES 15, 16, and 17 are different views of a modified form of the invention corresponding to FIGURES 10, 11, and 14, respectively.

FIGURES 18 and 19 are side elevational and end views, respectively, of a fixture appurtenant to the present invention, shown in open position to engage a conductor; while FIGURE 20 shows the device of FIGURES 18 and 19 in closed relationship upon a conductor.

FIGURES 21 and 22 show the operation of enclosing the conductor and fitting of FIGURE 20 by a set of helically preformed armor rods. FIGURES 23 and 24 are left and right hand mid-sectional elevational views of a socket fitting similar to that shown in front elevation in FIGURE 25.

FIGURE 26 shows in side elevation, partly in section, the application of socket fittings similar to those of FIGURES 23 to 25 applied to the assembly similar to FIGURE 22 to comprise a hanger for overhead transmission lines.

FIGURE 27 is a side elevational view of a modified form of cable hanger, while FIGURES 28 and 29 are a plan view, and sectional view taken along line 29—29 of FIGURE 28, respectively.

FIGURE 30 illustrates in side elevation a socket type of tap for overhead transmission lines, shown partly in section, embodying the principle of the hanger of FIGURE 26.

FIGURES 31 and 32 are modifications of the invention especially adapted to dampen vibrations of suspended lines, the latter figure being a sectional view taken along line 32—32 of FIGURE 31.

FIGURE 33 illustrates a means and method for tying together a pair of adjacent suspension lines involving the fittings shown in end view in FIGURE 35, while FIGURE 34 is a sectional view taken along line 34—34 of FIGURE 33 illustrating also a hanger or tap modification for this fitting.

FIGURE 36 is a further modified form of hanger in accordance with the present invention shown in side elevation, while FIGURE 37 is a sectional view taken along line 37—37 of FIGURE 36.

FIGURES 38 and 39 are plan views, shown partly in section, of different types of dead-ends made in accordance with the present invention, while FIGURE 40 is a sectional view taken along line 40—40 of FIGURE 39.

FIGURE 41 is a plan view of a type of vibration damper made in accordance with the present invention, and FIGURE 42 is a sectional view taken along line 42—42 of FIGURE 41.

In the drawings, in which like characters of reference relate to corresponding parts throughout, helically preformed reinforcements are composed of a plurality of helically preformed elements 10, similar to that shown in FIGURES 1 and 2. These may be of any suitable cross-sectional shape, this usually being either flat, as shown in my prior patent, above referred to, or round, as is shown in my pending applications, and as has been adopted herein for purposes of illustration.

A set of preformed armor rods is usually regarded as that number which, when assembled upon a conductor or other line-body of association, will completely enclose the same, or substantially so. As shown in FIGURE 3, a set of armor rods is divided into two groups, A and B, and these are arranged upon opposite sides of a conductor or core C and twisted into position on the latter, commencing as shown in this figure adjacent the centers of the rods and continuing by turning the groups of rods in opposite directions to enclose the core C by a set 12 of preformed armor rods as shown in FIGURE 4. The operation when completed is shown in FIGURES 5 and 6, in which the rods 10 are all in place on the core C to constitute a tube of armoring 12 thereupon.

Since the internal diameter of the helices 10 is slightly less than the external diameter of the core C, the rods 10 individually, and the tube of rods 12 collectively, tightly embrace the core C and resist axial displacement along the line. Also, the preformation and stiffness of the preformed stock is such as to resist unwinding, and to render the application of holding clamps or other tying means for retaining the armor in place entirely superfluous. Thus, projecting edges, corners, etc., usually associated with such attachments are eliminated, and electrical losses, as corona discharges, are minimized or precluded.

It has been found that the preformed rods 10 are as effective to hold other coaxial elements in place against a core or conductor as they are of retaining themselves thereon. This has given rise to the application of the devices shown in the ensuing figures of the drawings which are merely symbolic of means and methods for easily and inexpensively providing hanger brackets, vibration dampers, and various forms of taps and connectors to suspended transmission lines, and similar constructions.

Thus, in FIGURES 7 to 13, inclusive, there is illustrated one form of hanger bracket which, when used in conjunction with helically-preformed armor rods, constitutes one such attachment made in accordance with the present invention. In FIGURES 7 to 11, there is shown a hollow cylindrical member 14 which is divided along a plane of its central axis as at 16 to define a pair of complementary half-cylinders 18 and 20, respectively. The part 18 is provided with an autogeneously connected central fin 22 which has an opening 24 for engagement with a supporting member (not shown). The fin is biased with respect to the longitudinal axis of the member 14 so as to extend along its base lines of attachment to the member at an angle which agrees, or nearly agrees, with the pitch angle of a set of armor rods 12, as shown in FIGURE 12. The bore 26 of the member 14 is of a size to receive a conductor or core C in such a way as to permit the contiguous edges 16 of the parts 18 and 20 to come into engagement, or substantially so, when in position. The member 14 is separated into its component parts 18 and 20, and these are positioned oppositely with respect to a core C, as shown in FIGURE 9, and closed thereupon, as shown in FIGURES 10 and 11. A set of armor rods 12 of a length considerably greater than that of the member 14 is applied as previously described so as to be substantially centered with respect to the member 14. When finally applied, as is represented in FIGURE 12, the armor rods embrace the member 14 and enclose it upon the conductor, and extend along the latter in each direction for at least a few pitch lengths to each side of the member 14, where the rods bear against the conductor in tightly embracing relation. The pin 22 is accommodated between adjacent armor rods without undue distortion, and the ends of the member 14 are chamfered, as at 28, to prevent abrupt changes in the diameters to which the armor rods must be accommodated. The slight distortion to which the armor rods are subjected in adapting themselves to the larger diameter of the member 14 tends to increase the spacing between the rods at this point, as is better seen in FIGURE 22, and shortens the pitch somewhat, which exerts a crowding action and a tensile force upon the rods at the points where they are returned from the member 14 to the normal diameter of the conductor or core C to each side of the latter, and this appreciably increases the gripping effect on the core, and correspondingly strengthens the frictional bond therebetween. This principle will be found to apply throughout the several modifications of the invention as are described herein.

A modified form of hanger embodying this general arrangement is disclosed in FIGURES 15 to 17, inclusive. In this case, the hollow cylindrical member 30 is integral, preferably constructed of some reasonably resilient yet strong material, which is split at one side only, as at 32, to afford entry for the conductor or core C. The opening 32 is preferably arranged so that its central portion 34 aligns with the pitch angle of the armor rods to be associated therewith when in position thereon, while its outer portions 36 are either straight, or biased in the opposite direction to that of the central portion, as shown in FIGURE 15, so as to cross the armor rods when they are in place. Upstanding fins 38 are arranged at the edges of the central portions 34 of the opening 32 so as to project between adjacent rods 10 when they are in position thereon. When assembled, and hung by some hanger means symbolically represented by the hook in FIGURE 17, the tendency is for the fins 38 to be drawn together so as to close the cylindrical member 30 upon the core C, thus to resist forces tending to dislodge the latter. Here, again, the armor rods extend for a suitable distance to each side of the member 30 to reinforce the core C, minimize its bending, and to maintain the parts in tightly secured relation.

A variant of the foregoing types of hangers is shown in FIGURES 18 to 26, inclusive. Here a set of armor rods 12 is applied to enclose a length of conductor C including a bump or protuberance adjacent the middle of the assembly, as finally appears in FIGURE 22. The bump or protuberance is preferably an eliptical solid 40 of wood, plastic, metal, or any other suitable material. Actually, it can be formed by casting a lump of low-melting metal upon the core in a proper mold, or it can be made from servings of twine, wire or tape. However, whereas these could be considered as suitable in cases of emergency, they are not the most convenient forms, which preferably conform to the general construction, shown in FIGURES 18, 19, and 20. This comprises a chamfered cylinder or elliptical solid 40 having a bore 42 for accommodating the conductor or core C. The member 40 is split longitudinally into halves 44 and 46 for easy assemblage upon and around the core. When placed as shown in these figures, especially FIGURE 20, helical armor rods 10 are served along the conductor or core C, up and around the member 40, and down to and along the core again, as is shown in FIGURES 21 and 22. This provides a cable C with an armored portion having a bump or protuberance in its middle. A pair of sockets 47 and 48, (FIGURES 23 and 24) representing left and right units, respectively, have a tapering bore which is complementary to the slope of the taper of the armored bump on the core C and provides a bearing therefor. A slot 49, either as originally formed or by flexible expansion of the socket during assembly, provides access for the core so as to allow the sockets to be slipped thereupon without reference to the availability of the ends of the line constituting the core C for threading through the sockets, although this practice could, of course, be followed if provided for. The largest internal diameter of the sockets approaches the major external diameter of the armored bump, while the smallest internal diameter of the sockets is but slightly larger than the regular armored diameter of the core C. This provides that, when the sockets are opposed with their large openings toward each other, on opposite sides of the armored bump around the armored core or conductor C, they may be drawn into a wedging fit tightly to grip the assembly, as is shown in FIGURE 26. The sockets have lugs 50 arranged with eyes 52 which are merely typical of some suitable means for engaging the suspension means. As shown in FIGURE 26, this is some suitable arrangement for giving a toggle action to the sockets so that as the vertical component of the force of gravity is applied centrally of the assembly, an axial component is realized at each socket to urge it into more forceful engagement with the armored bump. The arrangement illustrated is an example without limitation. Here a pair of links 54 is engaged in the eyes 52 of the socket lugs 50, and connected centrally of the assembly to an element 56 of a support or hangar suspension means 58 which may be regarded as more or less conventional. The heavier the cable being supported, the tighter does this type of hangar assembly grip it.

The same may be said of the device shown in FIGURES 27 to 29. The core or conductor C having the helical armor 12 around it, and some protuberating means, as the member 40, arranged to provide the armored bump previously described, is engaged by cable sockets 60 and 62, tapered in complementary fashion to wedge upon the armored bump just as in the case of the foregoing construction. In this case, however, the sockets are carried at the ends of offset extensions 64 and 66 which are joined at their proximate ends centrally of the construction either temporarily, as by a suspension hook or bolt 68, or permanently by a grommet, or other perforate pivot (not shown). The fall of the assembly against the lift of the hanger 68 exerts a scissors or toggle action which tends to urge the sockets 60 and 62 into closer compliance with the armored bump.

Applying these same principles to line taps or drop wire connections, there is provided an arrangement similar to that shown in FIGURE 30. Here the cable C is provided with the armored bump previously described. Sockets 70 and 72, shaped to wedge upon the bump as already discussed in connection with the foregoing constructions, are provided with radial extensions 74 which terminate in annular bearings 75 adapted to accommodate a bolt, tie rod, or turnbuckle tension member 76, which is suitably threaded at one or both of its ends to accommodate one or more nuts or followers 77. By tightening the nuts, the sockets are drawn together into wedging engagement with the armored bump which, in turn, drives the armor rods into tight engagement with the underlying element 40 (which in this case is made of conductive material) and the latter is forced into intimate contact with the core or conductor C, making efficient electrical contact between all of the parts. A tap wire clamp 78 engaged upon the tie rod 76 for securing a tap wire 79 thereto completes the assembly.

In some of the embodiments, especially in taps just described, and where ever electrical union is important, the members 14 and 40, whatever their form, should have a central bore of a shape and size so as to permit their being drawn into tight engagement upon the underlying core C. This may mean that, when these parts are loosely assembled in the first instance, the adjacent edges of the component halves may not quite meet, but are forced to do so by the coaction of the forces arising from the armor rods being forced to assume a diameter larger than that to which they are preformed, and by the wedging action of the sockets as they are forcefully drawn toward each other upon the armored bump. This assures maximum area of intimate contact between the parts and assumes the best joint from the standpoint of electrical conductive properties.

In the case of FIGURES 31 and 32, however, this tight fit is not contemplated, nor, indeed, is it desirable. In this construction, the protuberating member 80 is designed with an oversize bore 82 with respect to the cable C, say, for example, in the order of a tenth of an inch (0.10″). Furthermore, the outer circumference of this member is enlarged considerably, and grooved helically to a lesser effective diameter for the accommodation of the helical armor rods therein without deformation beyond their elastic limit, and in a manner to conform to the pitch angle thereof. Grooves 84 accommodate the armor rods 10 and define the lands 86 which radiate between them. The armor rods 10, as in previously explained examples, extend axially of the cable C for a considerable distance at each side of the member 80. This provides an ideal vibration damper for suspended cable such as overhead transmission lines. The armor rods lock the member 80 axially of the line, but the member itself is loose thereupon, and is thus free to move against the resilience of the rods both radially and circumferentially thereof, the circumferential components reflecting the torque effort expended by the preformed helical armor rods moving in response to vibrational impulses of the line C. The lands 86 increase the inertia of the member 80 by adding weight and dynamic balance to the assembly, thus enlarging upon the forces effective to move it and enhancing its vibrational absorption powers as a damper.

It would, perhaps, be convenient to take up at this point the modified form of vibration damper illustrated in FIGURES 41 and 42. Here the member 80, otherwise the same as that just described, is provided with a pair or radial extensions 88 of diametrically opposed lands 86 of equal length which are provided with weights 89 at their extremities. These increase the inertia effect of the damper in a well-known manner, especially as to the components of torque which arise from the working of the helical armor rods 10 under conditions of rising and falling tension along the line C, and its flexing during vibration. The extensions 88 serve additionally as wind vanes which are canted, propeller fashion, to exert torque through the rods 10 upon the line C in a manner tending to tighten and bind the rods 10 thereto. Thus, in conditions of heaviest wind, which are also conditions of severest vibration, a damping force is introduced to the line that is proportional to the forces of wind acting upon it, and an efficient damper is thus realized.

Returning now to the passed-over figures, the device in FIGURES 33 to 35, inclusive, reveals a method and means for joining a pair of conductors or cables $C^1$ and $C^2$ together, either electrically or mechanically, and for optionally hanging or tapping such cables as exigency requires. Parallel Cables $C^1$ and $C^2$ are bridged by a pair of complementary plates 90 and 92 which have half bearings 94 arranged upon opposite edges to engage the conductors as appears in the sectional view of FIGURE 34. The plates are biased, propeller fashion, so as to dispose the line of entry thereof between the rods 10 into agreement with the pitch angle of lay of the helices. If the adjacent sets of armor rods are of opposite hand, the twist may be omitted from the bridge plates. If the device is to be used as a hanger or wire tap, a hole 96 centrally located may provide accommodation for a hanger bolt 98 or wire tap, FIGURE 34 illustrating the former. This device, when applied by the helical rods as already explained herein, tends to dampen vibrations between the lines, particularly when the bridging connection is effected at points to cause the harmonics of the two lines $C^1$ and $C^2$ to be out of phase so as mutually to interfere and cancel each other out. Also, the bridge 90 may be conducting or insulating, depending upon the use to which it will be put.

The arrangement of FIGURES 36 and 37 embodies the "squirrel-cage" or "hour-glass" form of disposition of several of the helical preformed armor rods 10 which may involve from two to all of the rods in the set. Four is the usual number arranged in diametric pairs, 90° apart. This arrangement of armor rods is shown in FIGURE 15 of my co-pending application Serial No. 698,312, filed September 20, 1946, and contemplates the diversion of several armor rods from their normal helical courses in the set of armor for one or more pitch lengths along the sides of the assembly to a point where they are returned to resume their own helical courses about the core C, or the courses of any of the others so diverted. In FIGURES 36 and 37, a concentric sleeve or bearing annulus 100, which may be either tight fitting for electrical union, or loose fitting for vibrational damping purposes is predisposed near the middle of the armor in surrounding relation to the core C and to such armor rods of the set 12 as remain undiverted from their normal helical courses around the core. The diverted rods bear upon this sleeve 100 at their points of tangency therewith and are prevented from chafing the enclosed assembly. In addition to providing a stiff mid-section to the armor thus arranged, the diverted rods provide a substantially rigid protuberance against which opposed tapered sockets 102 and 104 may bear as in the case of the construction of FIGURE 26. Lugs 106 are provided for engagement with flexible links or harness 108 which rides in a hanger saddle 110 of a conventional support. The toggle-action tending to draw the sockets toward each other to an extent proportional to the load thus suspended is present here as in previously described embodiments. In this illustration, however, there has been included a tension spring 112, connecting with lugs 114 that are diametrically opposed to the hanger lugs 106, which tends to draw the sockets together on the bottom side of the line to the same extent they are drawn by the toggle action on the topside of the line. This arrangement, which is equally applicable to the device of FIGURE 26, and other similar arrangements, prevents the sockets from binding by equalizing the forces acting thereon, thus to insure their being urged into the tightest engagement with the protuberances.

FIGURES 38 and 39 represent the utilization of protuberating means with helically preformed armor in the formation of dead-ends. In FIGURE 38, an end of a line C is predisposed in the socket 120 of a dead-end clevis 122, which has the usual opposed arms 124, and connecting bolt 126. The free end of the line to be dead-ended is first threaded through the socket 120 and pulled through for a good distance. A set of armor rods 12 are then started to be twisted into position a distance equal to about their own length from the end of the line. Any protuberating means discussed hereinbefore is introduced intermediate the ends of the armor rods before they are closed around the line, and the rods are then closed in the described manner substantially to the end of the line, where they may fall a little short, a little long, or just coterminous with the line C. The clevis is then drawn toward the end of the line until the armored bump seats firmly in the socket 120, as shown, whereupon the assembly may be fastened to any anchorage or puller by the bolt or pin 126. The greater the pull, the tighter this assembly grips the line.

FIGURES 39 and 40 relate to a type of dead-ends formed out of the helically preformed armor rods themselves after the manner shown and described in my application Serial No. 698,312, referred to above. In this type, a half set of armor rods 12 are bent adjacent their middle to form a bight portion 130 having two legs of half lays that are mutually intertwisted about the line C to make a whole set 12 upon the latter. One or more protuberating means are enclosed by the armor rods to form armored bumps 132 and 134, which, by virtue of the distortion and binding effect mentioned in the forepart of this specification, lock the dead-ending helices securely in place, and greatly augment their holding power on the line.

It will be appreciated that the holding power of dead ends, especially those formed as in FIGURE 39, is a function of the length that the armor rods extend axially of the conductor C, and increases as the length increases. One or more protuberating means applied as in this figure greatly augment the holding power so that for the same value, the length of armor rods employed may be reduced. A minimum length of rods for this purpose is made possible by the use of a socket, similar to the portion 120 of the clevis 122 (FIG. 38), but without the arms 124, positioned with relation to a bump and to the end of the cable as in that figure, which is driven axially of the cable, as by a hammer-blow, so as forcefully to wedge upon the armored bump or bumps in the construction of FIGURE 39. Alternatively, a clamp or vise may be used to cold-shut such an armless socket or band in this position actually to deform it into engagement with the armored bump and between the rods so as to enhance the grip of the assembly upon the line C being dead-ended. This enables the length of the set of armor rods employed, and the extent of line involved in the dead end, to be abbreviated to the minimum.

Although most of these examples have contemplated whole sets of armor rods, and, indeed, whereas this is the preferred number, still any number of armor rods less than this, down to and including one, can be used as means for locking protuberating means, hangers and taps to such lines. Also, such instrumentalities as have been shown to comprise split half-cylinders, etc., as in FIGURES 7 and 18, among others, only the desired half of such devices need actually be employed, since they will be as effectively held against the line by helical armor rods as the wholly assembled parts. Furthermore, the holding power of the helices on the lines may be enhanced by the interposition of grit or other friction-generating medium. Furthermore, the protuberating means 40, may be coated with abrasive grit, or serrated inside and out to increase its gripping of the line and retention of the rods. The interior surfaces of any of the sockets shown herein can be similarly treated.

There is no intention to limit these inventions as to number, placement and size of protuberating means. For instance, the distance the sockets are spaced in FIGURES 26, 30 and 36 is purely arbitrary. Two bumps may be employed, one for each socket, any distance apart as in FIGURE 39, or these may be merged into one long bump. Such an arrangement can be further modified by reversing the direction in which the sockets face (in relation to FIGURES 26 and 36) and by disposing them between a pair of bumps, similar to those of FIGURE 39. Then, a hanging means, or an encircling vibration damping member, could be applied intermediately of the sockets to spread them into wedging engagement with the bumps, in a reciprocal manner to the toggle actions derived from the constructions of FIGURES 26 and 36, but for the same intents and purposes as the latter. These obvious modifications are believed to speak for themselves, and require no further discussion beyond the statement that the invention, as claimed, is not so limited.

I claim:

The method of affixing appliances to elongated bodies which includes dividing a protuberating means into two sections, applying the sections in opposed relation with respect to an elongated body substantially to enclose a portion of the latter, dividing a set of helically-preformed armor rods into groups, applying the groups of armor rods adjacent their mid portions to said protuberating means, and commencing adjacent their middles, twisting the rods about said protuberating means and outwardly from each end thereof along the elongated body until in helical disposition about the entire assembly.

References Cited in the file of this patent

UNITED STATES PATENTS

| | | |
|---|---|---|
| 1,061,252 | Matricardi | May 6, 1913 |
| 1,155,460 | Barkaur | Oct. 5, 1915 |
| 1,906,782 | Zapf | May 2, 1933 |
| 1,968,888 | Hillebrand | Aug. 7, 1934 |
| 2,016,856 | Fiege | Oct. 8, 1935 |
| 2,172,810 | Sherman | Sept. 12, 1939 |
| 2,275,019 | Peterson | Mar. 3, 1942 |
| 2,587,521 | Peterson | Feb. 26, 1952 |

FOREIGN PATENTS

| | | |
|---|---|---|
| 118,501 | Great Britain | Sept. 5, 1918 |
| 591,592 | Germany | Jan. 24, 1934 |
| 467,781 | Great Britain | June 23, 1937 |
| 864,361 | France | Jan. 13, 1941 |